United States Patent
Rensel et al.

(10) Patent No.: US 6,474,380 B1
(45) Date of Patent: Nov. 5, 2002

(54) PNEUMATIC TIRE AND MONITORING DEVICE INCLUDING DIPOLE ANTENNA

(75) Inventors: John D. Rensel, Tallmadge, OH (US); Gordon E. Hardman, Boulder, CO (US); John W. Pyne, Erie, CO (US)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 0 days.

(21) Appl. No.: 09/302,070

(22) Filed: Apr. 29, 1999

(51) Int. Cl.[7] .......................... B60C 19/00; B60C 23/00
(52) U.S. Cl. ................ 152/152.1; 73/146.5; 340/442; 340/447
(58) Field of Search ................ 152/152.1; 340/442, 340/447; 73/146, 146.5

(56) References Cited

U.S. PATENT DOCUMENTS

| | | | |
|---|---|---|---|
| 3,662,335 A | * 5/1972 | Fritze | 152/152.1 |
| 3,694,803 A | 9/1972 | Strenglein | 340/58 |
| 3,787,806 A | 1/1974 | Church | 340/58 |
| 3,806,869 A | 4/1974 | Davis, Jr. | 340/58 |
| 3,806,905 A | 4/1974 | Strenglein | 340/224 |
| 3,895,347 A | * 7/1975 | Takusagawa et al. | |
| 4,010,354 A | 3/1977 | Apicella, Jr. et al. | 235/61.6 R |
| 4,067,235 A | 1/1978 | Markland et al. | 73/146.5 |
| 4,137,520 A | 1/1979 | Deveau | 340/58 |
| 4,160,234 A | 7/1979 | Karbo et al. | 340/58 |
| 4,237,728 A | 12/1980 | Betts et al. | 73/146.5 |
| 4,311,985 A | 1/1982 | Gee et al. | 340/58 |
| 4,319,220 A | 3/1982 | Pappas et al. | 340/58 |
| 4,334,215 A | 6/1982 | Frazier et al. | 340/539 |
| 4,494,106 A | 1/1985 | Smith et al. | 340/58 |
| 4,531,112 A | * 7/1985 | Thomas | |
| 4,570,152 A | 2/1986 | Melton et al. | 340/58 |
| 4,578,992 A | 4/1986 | Galasko et al. | 73/146.5 |
| 4,588,978 A | 5/1986 | Allen | 340/58 |
| 4,609,905 A | 9/1986 | Uzzo | 340/58 |
| 4,695,823 A | 9/1987 | Vernon | 340/58 |
| 4,717,905 A | 1/1988 | Morrison, Jr. et al. | 340/58 |

(List continued on next page.)

FOREIGN PATENT DOCUMENTS

| | | | |
|---|---|---|---|
| DE | 3736803 A1 | 5/1989 | |
| EP | 0 505 906 A1 | 9/1992 | |
| EP | 505906 | * 9/1992 | 152/152.1 |
| JP | 11042915 A | 2/1999 | |
| WO | WO 90/12474 | 10/1990 | |
| WO | WO 99/29522 | 6/1999 | |
| WO | WO 99/29524 | 6/1999 | |
| WO | WO 99/29525 | 6/1999 | |
| WO | WO 00/07834 | 2/2000 | |
| WO | WO 00/08598 | 2/2000 | |

OTHER PUBLICATIONS

Blow, Rubber Technology and Manufacture, pp. 345–356, 1971.*
Tigris: A Vehicle Tracking System using Passive Radio Transponders, IEEE, 1993.
Antenna Polarization Considerations, Nov. 1998 edition of Wireless Design & Development.

Primary Examiner—Steven D. Maki
(74) Attorney, Agent, or Firm—John M. Vasuta; Michael Sand; Fred H. Zollinger, III

(57) ABSTRACT

A pneumatic tire and monitoring device for monitoring an engineering condition of a pneumatic tire includes a pneumatic tire having a sidewall and a plurality of reinforcing cords carried in the sidewall. The monitoring device includes a sensing element that senses at least an engineering condition of a pneumatic tire and transmits the gathered data from the monitoring device to a data gathering device outside of the tire. The transmission occurs through a dipole antenna that is in communication with the sensing element. The dipole antenna is disposed substantially perpendicular to the reinforcing cords in order to maximize the probability of signal propagation through the tire sidewall.

2 Claims, 4 Drawing Sheets

U.S. PATENT DOCUMENTS

| | | | |
|---|---|---|---|
| 4,816,839 A | 3/1989 | Landt | 343/795 |
| 4,845,649 A | 7/1989 | Eckhardt et al. | 364/571.02 |
| 4,862,486 A | 8/1989 | Wing et al. | 377/16 |
| 4,911,217 A | 3/1990 | Dunn et al. | 152/152.1 |
| 4,953,393 A | 9/1990 | Galasko et al. | 73/146.5 |
| 5,181,975 A | 1/1993 | Pollack et al. | 152/152.1 |
| 5,196,845 A | 3/1993 | Myatt | 340/870.31 |
| 5,218,861 A | 6/1993 | Brown et al. | 73/146.5 |
| 5,231,872 A | 8/1993 | Bowler et al. | 73/146.5 |
| 5,235,850 A | 8/1993 | Schurmann | 73/146.5 |
| 5,285,189 A | 2/1994 | Nowicki et al. | 340/447 |
| 5,319,354 A | 6/1994 | Myatt | 340/572 |
| 5,348,067 A | 9/1994 | Myatt | 152/152.1 |
| 5,413,159 A | 5/1995 | Olney et al. | 152/418 |
| 5,479,171 A | 12/1995 | Schuermann | 342/44 |
| 5,483,826 A | 1/1996 | Schultz et al. | 73/146.5 |
| 5,483,827 A | 1/1996 | Kulka et al. | 73/146.5 |
| 5,500,065 A | 3/1996 | Koch et al. | 156/123 |
| 5,541,574 A * | 7/1996 | Lowe et al. | |
| 5,552,789 A | 9/1996 | Schuermann | 342/42 |
| 5,559,484 A | 9/1996 | Nowicki et al. | 340/447 |
| 5,562,787 A | 10/1996 | Koch et al. | 156/64 |
| 5,573,610 A | 11/1996 | Koch et al. | 152/152.1 |
| 5,573,611 A | 11/1996 | Koch et al. | 152/152.1 |
| 5,600,301 A | 2/1997 | Robinson, III | 340/442 |
| 5,731,754 A | 3/1998 | Lee, Jr. et al. | 340/447 |
| 5,909,050 A * | 6/1999 | Furey et al. | 152/152.1 |
| 5,960,844 A * | 10/1999 | Hamaya | 152/152.1 |
| 5,964,265 A * | 10/1999 | Becherer | 152/152.1 |
| 5,971,046 A * | 10/1999 | Koch et al. | 152/152.1 |
| 6,030,478 A * | 2/2000 | Koch et al. | 152/152.1 |
| 6,036,179 A * | 3/2000 | Rensel | 152/152.1 |
| 6,082,192 A * | 7/2000 | Koch et al. | 152/152.1 |
| 6,161,430 A * | 12/2000 | Koch et al. | 152/152.1 |

\* cited by examiner

PNEUMATIC TIRE AND MONITORING DEVICE INCLUDING DIPOLE ANTENNA

BACKGROUND OF THE INVENTION

1. Technical Field

This invention generally relates to monitoring devices for pneumatic tires and, more particularly, to a monitoring device having a dipole antenna used to monitor at least one engineering condition of a tire and to transmit information relating to the engineering condition to an information-gathering device positioned outside of the tire. Specifically, the present invention relates to a monitoring device having a radial dipole antenna mounted on the inside of a pneumatic tire and arranged orthogonally to the lines of electrical interference in the tire sidewall so that the probability of signal propagation through the tire sidewall is improved.

2. Background Information

It is desired in the art to monitor the conditions of a pneumatic tire while the tire is installed and in use on a vehicle. Although it is desirable to monitor engineering conditions of passenger car tires as well as truck and bus tires, it is particularly desirable to monitor the conditions of off-the-road tires because of the relatively high cost of the tires and the desire to prevent down time from a tire failure. Measuring the engineering conditions of a tire preferably occurs while the tire is in use on the off-the-road vehicle without having to remove the tire from the vehicle or specifically position the tire to take the measurements. Measuring the engineering conditions in this manner prevents the vehicle from being removed from service and thus increases the efficiency of the vehicle. Furthermore, by indicating when a tire is under-inflated, it allows prompt re-inflation to correct pressure which increases tire life providing an economic benefit.

Numerous types of monitoring devices are known in the art to perform these measurements. One type of monitoring device uses a passive integrated circuit imbedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active self-powered programmable electronic devices are disclosed in U.S. Pat. Nos. 5,573,610, 5,562,787, and 5,573,611 which are assigned to the assignee of the present application.

Each of the active self-powered programmable electronic devices includes an antenna that is used to transmit the information gathered by the monitoring device to the information-gathering device positioned outside of the tire. One of the problems in the art is to position and configure the antenna such that the data created by the monitoring device are accurately transmitted to the information gathering device outside of the tire. In many multi-point communication systems, linearly polarized antennas are used to transmit the information gathered by the monitoring device to the information-gathering device. It is known in the art that misalignment between the sensitive access of the antennas will result in a polarization mismatch and thus a reduction in system communications efficiency. Use of linearly polarized antennas in tires that constantly change position due to wheel rotation thus create problems. It is generally desirable that one of the antennas be circumferentially polarized. It is also known in the art that transmission efficiency is reduced when a transmission must pass from one material to another material. It is thus desired to position the antenna as close to the outside of the pneumatic tire as possible in order to minimize the number of material changes that the transmission experiences. In the past, the antenna of the monitoring device generally extended into the interior chamber of the tire such that the radio waves had to first pass through the air inside the tire, through the innerliner, through the tire sidewall, and then through the air to the data gathering device. It is thus desired in the art to provide an antenna for an active, self-powered programmable electronic device that is positioned and configured to maximize the probability of signal propagation through the tire sidewall.

The bead ring and apex filler of the tire tend to interfere with the radially-disposed radio transmissions from the monitoring device. It has also been found that the steel reinforcing cords of the sidewall in an off-the-road tire also interfere with the signal propagation. The metal reinforcing cords create lines of electrical interference that must be considered when designing an antenna for an electronic monitoring device for a pneumatic tire. Another problem with transmitting through a tire sidewall is that the rubber of the sidewall may include carbon material that degrades the signal propagation. Another problem with transmitting through a tire sidewall is that the power that drives the transmission is limited by government radio regulations and design consideration. Electronic monitoring devices are preferably small power sources. The amount of power to drive the transmission is thus limited and the design of the antenna must consider the limited power of the monitoring device, in order to ensure a long lifetime for said device.

SUMMARY OF THE INVENTION

In view of the foregoing, it is an objective of the present invention to provide a monitoring device and antenna configuration that maximizes the probability of signal propagation through the tire sidewall.

Another objective of the present invention is to provide a monitoring device and antenna configuration for a pneumatic tire that uses a -radial dipole antenna connected to an electronic monitoring device.

Another objective of the present invention is to provide a monitoring device and antenna configuration that orients the -radial dipole antenna orthogonally with respect to the lines of electrical interference to maximize the probability of signal propagation through the tire sidewall.

Another objective of the present invention is to provide a monitoring device and antenna configuration for a pneumatic tire where the radial dipole antenna is disposed closely adjacent the tire sidewall so that the signal propagates directly into the sidewall.

Another objective of the present invention is to provide a monitoring device and antenna configuration for a pneumatic tire that retains the antenna in a specific orientation and seals the antenna from the inside of the tire.

Another objective of the present invention is to provide a monitoring device and antenna configuration for a pneumatic tire that is of simple construction, that achieves the stated objectives in a simple, effective, and inexpensive manner, that solves the problems, and that satisfies the needs existing in the art.

These and other objectives and advantages of the present invention are obtained by a monitoring device for a pneumatic tire including at least one sensing element for sensing at least one engineering condition of the pneumatic tire; and a radial dipole antenna in electrical communication with the sensing element.

Other objectives and advantages of the present invention are achieved by the combination of a pneumatic tire; a monitoring device for monitoring at least one engineering condition of the pneumatic tire; the pneumatic tire having a sidewall; the monitoring device having at least one sensing element for sensing at least one engineering condition of the pneumatic tire; and a pole antenna in electrical communication with the sensing element.

Still other objectives and advantages of the present invention are achieved by the combination of a pneumatic tire and a monitoring device for monitoring at least one engineering condition of the pneumatic tire; the pneumatic tire having a sidewall and a plurality of reinforcing cords carried in the sidewall; a bead ring disposed in the tire sidewall; the monitoring device having at least one sensing element for sensing at least one engineering condition of the pneumatic tire; and a dipole antenna in electrical communication with the sensing element; the antenna overlying at least one of the reinforcing cords and being disposed substantially perpendicular to each of the reinforcing cords that it overlies.

BRIEF DESCRIPTION OF THE DRAWINGS

The preferred embodiments of the invention, illustrative of the best mode in which applicant has contemplated applying the principles of the invention, are set forth in the following description and are shown in the drawings and are particularly and distinctly pointed out and set forth in the appended claims.

Similar numbers refer to similar parts through the specification.

DESCRIPTION OF THE PREFERRED EMBODIMENTS

Figure 1:
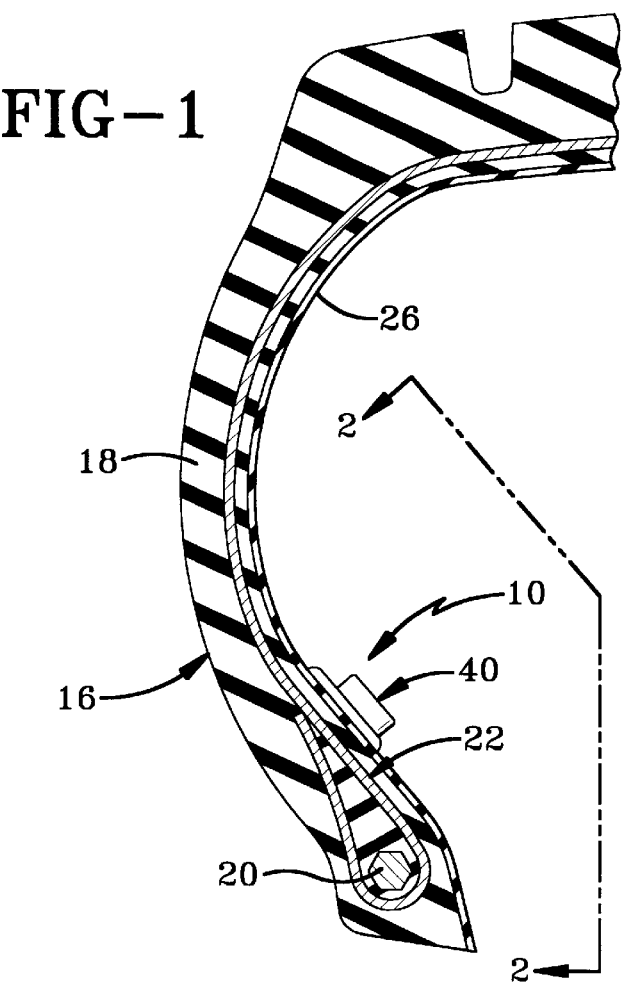
FIG. 1 is a sectional view of a pneumatic tire with an electronic monitoring device mounted on the innerliner of the tire.
Figure 3:
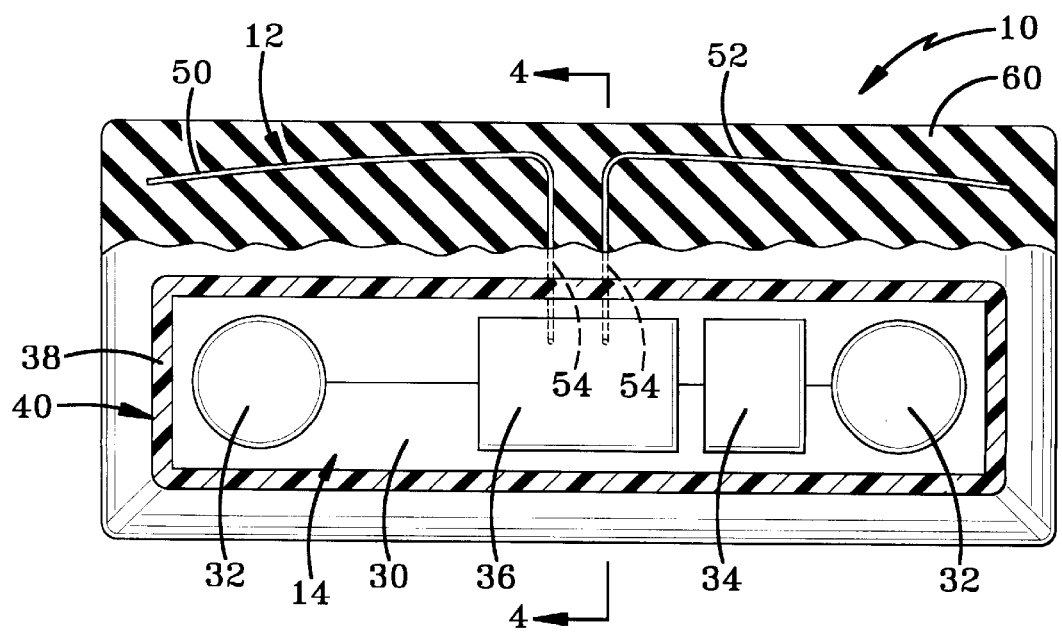
FIG. 3 is a fragmented top plan view of the monitoring device and antenna configuration of the present invention.

The first embodiment of the monitoring device and antenna combination of the present invention is depicted in FIGS. 1–4 and is indicated generally by the numeral 10. In accordance with one of the objectives of the invention, monitoring device and antenna combination 10 includes a dipole antenna 12 that is connected to a monitoring device 14. Dipole antenna 12 is mounted on a pneumatic tire 16 in a manner that maximizes the probability of desirable signal propagation through the tire sidewall 18.

Pneumatic tire 16 includes a bead ring 20 from which sidewall 18 extends outwardly substantially radially. A package of reinforcing cords 22 extends around bead ring 20 and radially outward through sidewall 18. Reinforcing cord package 22 may be fabricated from a variety of materials and disposed in a variety of orientations in sidewall 18. In large, off-the-road tires, reinforcing cord package 22 may include a plurality of metal reinforcing cords 24 that each extend radially outward through sidewall 18. Cords 24 are thus closer together adjacent bead ring 20 that at the outer radius of sidewall 18. Tire 16 further includes an innerliner 26 positioned on the inside surface of tire 16. Innerliner 26 may be significantly thicker in off-the-road tires than it is in passenger car tires. As is known in the art, pneumatic tire 16 is mounted on a rim and has a pressurized inner chamber when in use. Monitoring device and antenna combination 10 are disposed in this pressurized chamber as shown in FIG. 1.

Monitoring device 14 may include a board 30 upon which a pair of batteries 32, a central processing unit (CPU) 34, and at least one sensing element 36 are mounted. Various other elements may also be positioned on board 30. This specific configuration of monitoring device 14 is not to limit the scope of the invention as numerous monitoring device configurations will function with the present invention. Antenna 12 is in electrical communication with sensing element 36 such that the information gathered by sensing element 36 can be transmitted by antenna 12 outside of tire 16. Components 30, 32, 34, and 36 are all encapsulated by an encapsulation material 38 to form an encapsulated monitoring device 40. Encapsulation material 38 provides protection to components 30, 32, 34, and 36. Encapsulation material 38 may be a suitable epoxy or other material that is substantially rigid after it has encapsulated the components.

Dipole antenna 12 includes a first antenna element 50 and a second antenna element 52 that extend away from each other. Each element 50 and 52 may be preferably fabricated from a round metal wire although different materials may be used without departing from the concepts of the invention. Dipole antennas are known in the art and may have various configurations, any of which may be used with the present invention. Each antenna element 50 and 52 is connected to and is in electrical communication with sensing element 36 by a suitable connector 54 that may be one of a variety of connectors known in the art.

Antenna 12 is disposed in an attachment patch 60 that is used to mount encapsulated monitoring device 40 on innerliner 26. Attachment patch 60 includes a foot portion 62 that extends away from encapsulated monitoring device 40. Antenna 12 is preferably located in foot portion 62. Encapsulated monitoring device 40 is mounted on attachment patch 60 by a suitable connector, such as an adhesive that is known in the art. Similarly, attachment patch 60 is mounted on innerliner 26 by a suitable connector, such as an adhesive, that is known in the art.

Figure 2:
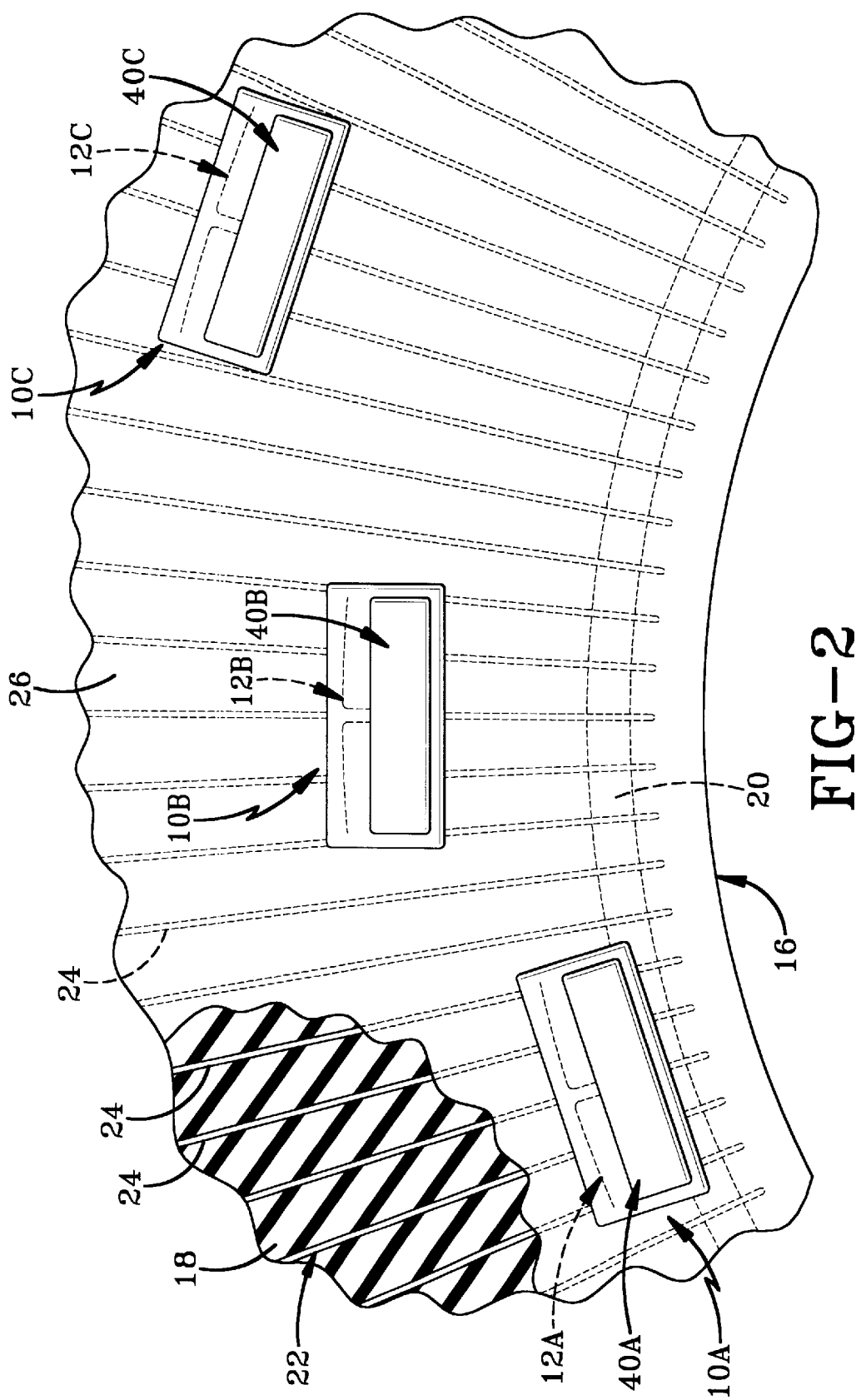
FIG. 2 is a view of the monitoring device and tire sidewall taken along line 2—2 of FIG. 1 showing different locations for the monitoring device with antennas having different curvatures.
Figure 4:
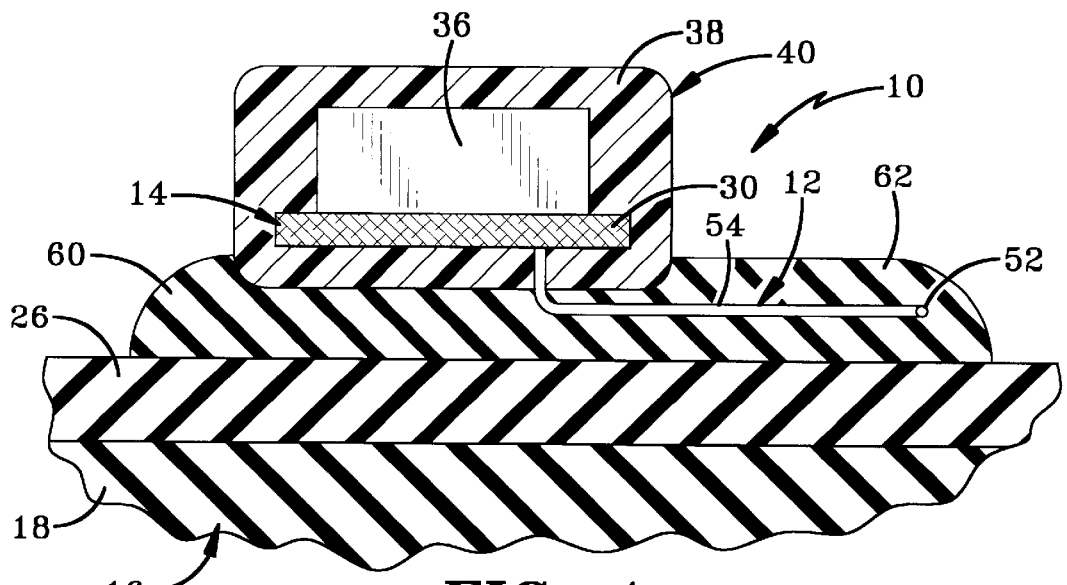
FIG. 4 is a sectional view taken along line 4—4 of FIG. 3.

As may be seen in FIGS. 1 and 2, antenna 12 is arranged and configured with respect to tire sidewall 18 such that antenna 12 is above bead ring 20 and substantially perpendicular or orthogonally oriented to reinforcing cords 24. In accordance with one of the objectives of the invention, locating antenna 12 substantially perpendicularly to reinforcing cords 24 maximizes the probability of desirable signal propagation through tire sidewall 18. When monitoring device and antenna combination 10 is used with another tire that has reinforcing cords 24 that are biased, antenna 12 is turned so that antenna 12 remains substantially perpendicular to reinforcing cords 24. It has been found that the signal propagation pattern from radial dipole antenna 12 provides a good probability of signal propagation through sidewall 18.

FIG. 2 depicts three monitoring device and antenna combination 10 locations as shown at 10A, 10B, and 10C. Each combination 10A, 10B, and 10C Includes an antenna 12A, 12B, and 12C connected to an encapsulated monitoring device 40A, 40B, 40C. The curvature of each antenna 12A, 12B, and 12C matches its location with respect to sidewall 18 such that the curvature of antenna 12 is substantially equal to the radius of curvature of sidewall 18. The dipole antenna, which is mounted to the tire at one of a plurality of radius distances defined by the sidewall, has a radius of curvature that is substantially equal to the radial distance where the dipole antenna is mounted. As such, the radius of curvature of antenna 12A is less than the radius of curvature of antenna 12B and both radii of curvatures for antennas 12A and 12B are less than the radius of curvature for antenna 12C. By matching the radius of curvature of antenna 12A with its location on tire sidewall 18, each intersection of antenna 12 with a reenforcing cord 24 is substantially perpendicular or orthogonal.

Figure 5:
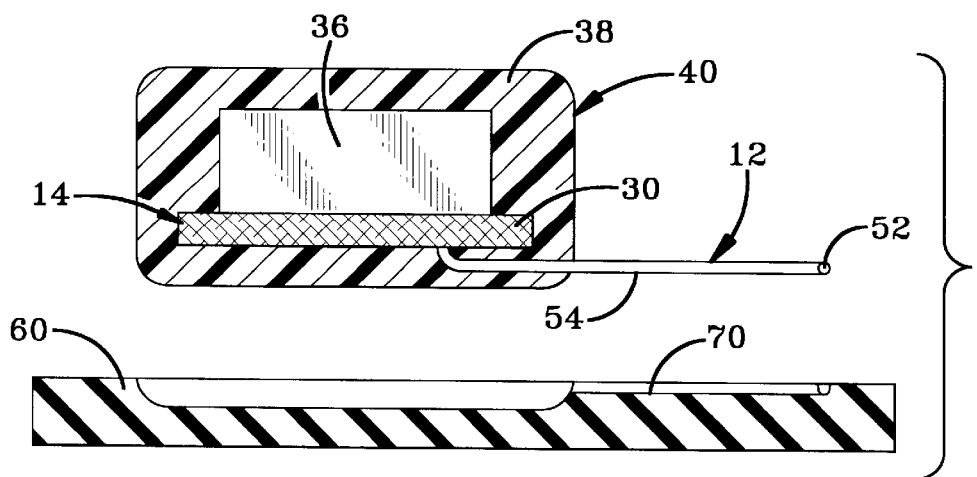
FIG. 5 is a sectional view of a first alternative embodiment of the monitoring device and antenna configuration of the present invention with the monitoring device and antenna removed from an attachment patch.
Figure 6:
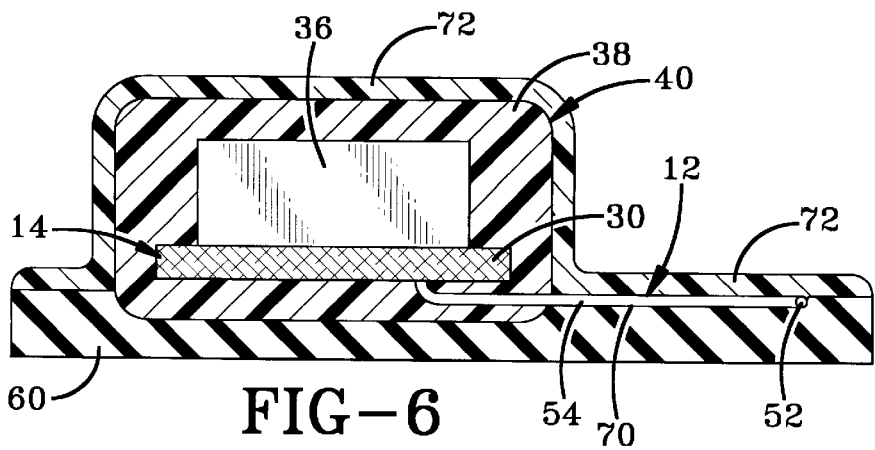
FIG. 6 is a sectional view of the first alternative embodiment of the monitoring device and antenna configuration with the monitoring device attached to the attachment patch and covered with a covering material.

The first alternative embodiment of the invention is depicted in FIGS. 5 and 6. The components of the first alternative embodiment are substantially the same as described above and the same numbers are used to refer to the same elements. In this embodiment, patch 60 includes a groove 70 into which antenna 12 is placed when encapsulated monitoring device 40 is attached to attachment patch 60. Groove 70 properly positions antenna 12 with respect to attachment patch 60 so that a person installing attachment patch 60 and encapsulated monitoring device 40 will know that antenna 12 is oriented in a certain manner with respect to patch 60. After antenna 12 is disposed within groove 70 and encapsulated monitoring device 40 is securely to attachment patch 60, a covering material 72 is positioned over antenna 12 and groove 70 to cover antenna 12 from the inside of tire 16. Covering material 72 also holds antenna 12 in position. Covering material 72 preferably may be an epoxy but may be other materials that are known in the art.

Figure 7:
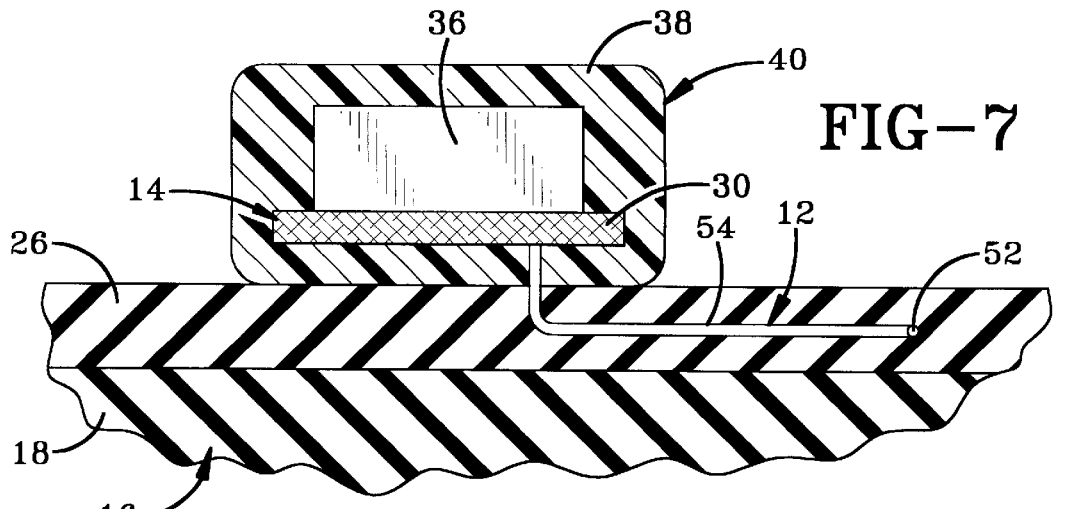
FIG. 7 is a sectional view of the second alternative embodiment of the present invention.

The second alternative embodiment of the invention depicted in FIG. 7 where antenna 12 is embedded within innerliner 26. In this embodiment, antenna 12 is positioned within innerliner 26 during the fabrication of tire 16 such that antenna 12 is substantially perpendicular to reinforcing cords 24. Tire 16 is then cured with antenna 12 which is held in innerliner 26. Monitoring device 14 is then connected to antenna 12 at a later time by known means.

Figure 8:
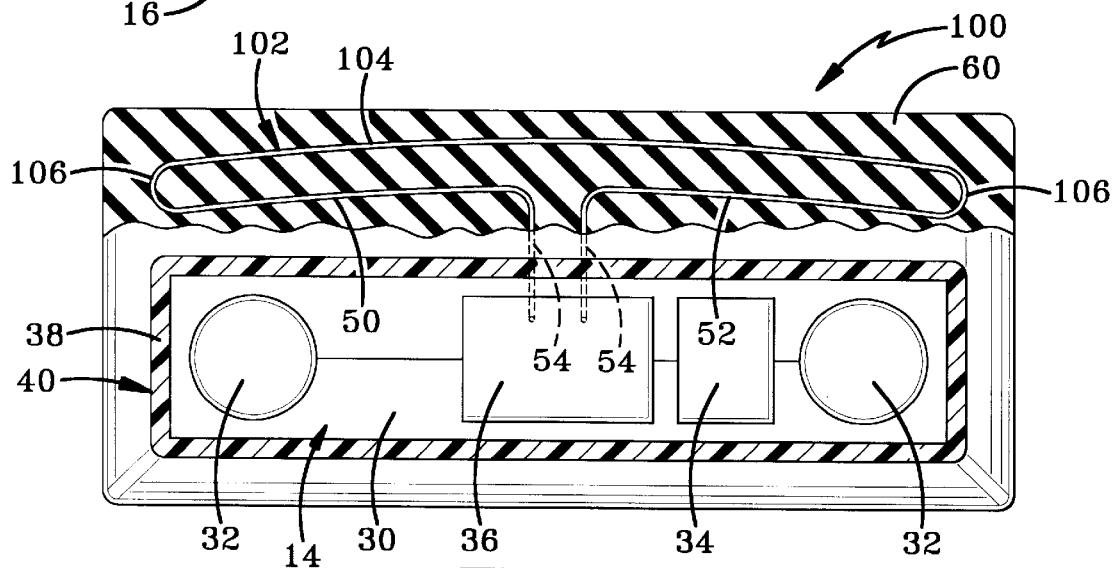
FIG. 8 is a view similar to FIG. 3 showing a third alternative embodiment of the present invention.

A third alternative configuration of the monitoring device and antenna combination of the present invention is depicted in FIG. 8 and is indicated generally by the numeral 100. The antenna 102 of configuration 100 includes first antenna element 50 and second antenna element 52 of radial-dipole antenna 12 discussed above. Antenna 102 further includes a third antenna element 104 that is spaced from first and second antenna elements 50 and 52. Third antenna element 104 is connected to first and second elements 50 and 52 by a pair of end elements 106 that are substantially semicircular. In accordance with the objectives of the present invention, antenna elements 50, 52, and 104 are oriented substantially perpendicular to the lines of electrical interference in sidewall 18.

Figure 9:
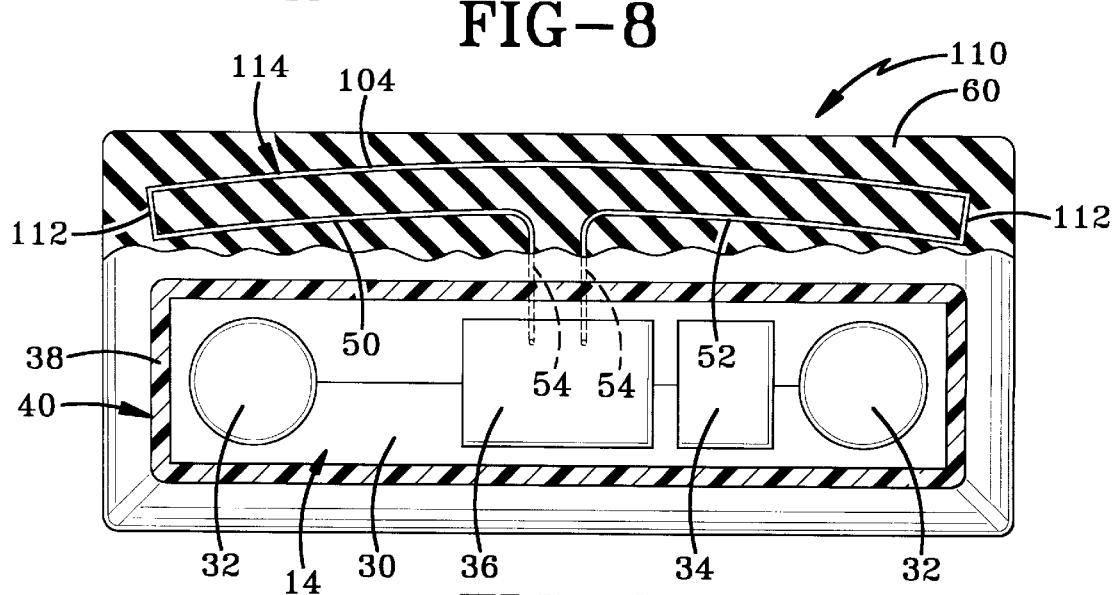
FIG. 9 is a view similar to FIGS. 3 and 8 showing a fourth alternative embodiment of the present invention.

A fourth alternative embodiment of the monitoring device and antenna combination of the present invention is depicted in FIG. 9 and is indicated generally by the numeral 110. Combination 110 includes substantially the same elements as combination 100 disclosed above. The only difference is that the end elements 112 of radial dipole antenna 114 are each substantially perpendicular to the end portions of antenna elements 50, 52 and 104. In accordance with the objectives of the present invention, radial dipole antenna 114 is positioned to be substantially perpendicular to the lines of electrical interference in sidewall 18.

Accordingly, the improved-radial dipole antenna and tire tag combination is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the radial dipole antenna and tire tag combination is constructed and used, the characteristics of the construction, and the advantageous new and useful results obtained; the new and useful structures, devices, elements, arrangements, parts, and combinations are set forth in the appended claims.

What is claimed is:

1. In combination:
    a pneumatic tire;
    a monitoring device for monitoring at least one engineering condition of the pneumatic tire;
    the pneumatic tire having a sidewall defining a plurality of radial distances;
    the monitoring device having at least one sensing element for sensing at least one engineering condition of the pneumatic tire;
    a dipole antenna in electrical communication with the sensing element;
    the dipole antenna being mounted to the tire sidewall at one of the radial distances of the sidewall; and
    the dipole antenna having a radius of curvature that is substantially equal to the radial distance where the dipole antenna is mounted.

2. The combination of claim 1, further comprising a plurality of reinforcing cords radially disposed in the sidewalls.

* * * * *